Figure 2:
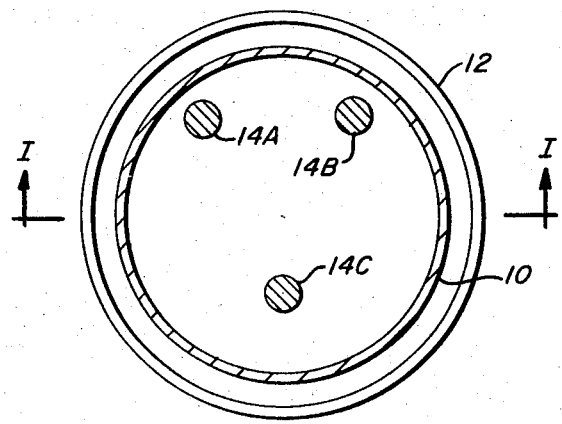

United States Patent

Buehl

[11] 3,865,174
[45] Feb. 11, 1975

[54] METHOD FOR THE NONCONSUMABLE ELECTRODE MELTING OF REACTIVE METALS

[75] Inventor: Russell C. Buehl, Beaver, Pa.
[73] Assignee: Crucible Inc., Pittsburgh, Pa.
[22] Filed: Jan. 23, 1974
[21] Appl. No.: 435,915

Related U.S. Application Data
[63] Continuation-in-part of Ser. No. 300,639, Oct. 25, 1972, abandoned.

[52] U.S. Cl. .......................... 164/52, 164/97, 13/18
[51] Int. Cl. ............................................ B22d 27/02
[58] Field of Search ....... 164/52, 252, 97; 79/75.18; 13/18

[56] References Cited
UNITED STATES PATENTS

| | | | |
|---|---|---|---|
| 2,370,467 | 2/1945 | Hopkins | 164/52 |
| 3,617,596 | 11/1971 | DeCorso | 13/31 |
| 3,640,700 | 2/1972 | Suzuki et al. | 13/18 X |

Primary Examiner—Francis S. Husar
Assistant Examiner—John E. Roethel

[57] ABSTRACT

A method for vacuum arc melting of reactive metals and alloys thereof, particularly titanium and alloys thereof, wherein apparatus is provided to permit arc melting in a mold having a nonoxidizing atmosphere wherein particles of the alloy to be melted are introduced to about the center of the mold cross section and are melted by an arc produced by a nonconsumable electrode offset from said center of the mold; preferably a plurality of such offset electrodes are used. The invention during the melting operation provides an embryo casting having a generally conical, partially solidified portion extending axially with respect to the mold; this permits feeding of solid materials to the mold while eliminating splashing of molten metal to the mold wall thereby improving the surface quality of the ingot.

6 Claims, 2 Drawing Figures

PATENTED FEB 1 1 1975 3,865,174

METHOD FOR THE NONCONSUMABLE ELECTRODE MELTING OF REACTIVE METALS

This application is a continuation-in-part of co-pending application Ser. No. 300,639, filed Oct. 25, 1972, now abandoned.

In the nonconsumable-electrode arc melting of reactive metals and their alloys, and particularly titanium, it is customary to conduct the melting operation in a water-cooled mold that has a nonoxidizing atmosphere. Specifically, the mold interior in which the arc melting operation is conducted is generally maintained under a vacuum and the gaseous impurities evolved during melting are continuously removed from the mold. It is customary in the melting of alloys of this type to subject the same to a plurality of arc melting operations to achieve the desired high purity. In the initial melting operation it is customary practice to employ a nonconsumable electrode, which may be constructed of copper or graphite, to produce a melting arc within the mold. The alloy in solid, particle form, which may be scrap and metal of the alloy to be produced, is introduced to the mold for melting as by the use of a vibratory feeder mechanism. These particles for melting are introduced to a molten alloy pool within the mold and the melting action is achieved by an arc produced between the electrode tip and the surface of this molten alloy bath. After an initial melting operation of this character by the use of a nonconsumable electrode, the resulting ingot is then remelted, again by arc melting with the ingot being a consumable electrode. This operation may be repeated until the desired purity is achieved.

During the initial nonconsumable, vacuum arc melting operation generally a single electrode is employed and is disposed axially with respect to the mold; the particles of material to be melted are consequently introduced at a location between the centrally disposed electrode and the mold interior walls. When the particles strike the molten bath they customarily cause quantities of the molten metal to splash onto the mold walls, adhere thereto and result in a collar-like projection extending from the mold wall toward the axis of the mold. This buildup many times continues to the extent that some of the solid particles introduced to the mold for melting contact and adhere to this collar instead of dropping into the molten metal bath; in such instances the particles will remain adjacent the mold wall in unmelted form. Consequently, the ingot will contain a substantial surface portion having unmelted particles, such as scrap, which impairs the homogeneity of the ingot and reduces the effectiveness of subsequent consumable-electrode vacuum arc melting operations wherein the ingot is used as the consumable electrode.

It is therefore a primary object of the present invention to provide a method and apparatus for melting of reactive metals and alloys, particularly titanium, wherein splashing and buildup along the interior mold walls is eliminated to result in a more homogeneous ingot during an initial non-consumable arc melting operation.

Another object of the invention is to produce a homogeneous titanium-base alloy ingot by a method that saves power and operating time by not melting all of the solid particle charge.

Figure 1:
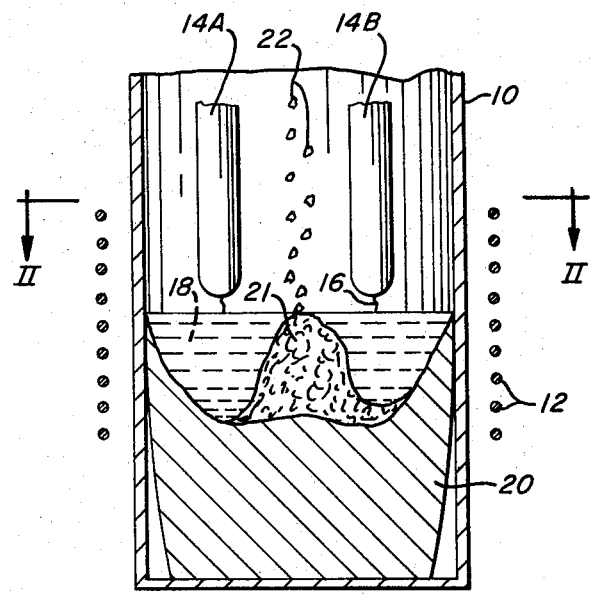

This and other objects of the invention, as well as a complete understanding thereof, may be obtained from the following description and drawings in which:

FIG. 1 is a schematic side elevation, partly in cross-section, taken along lines I—I of FIG. 2, of a portion of a vacuum arc melting furnace incorporating the features of the invention; and FIG. 2 is a schematic view of the furnace of FIG. 1, partly in horizontal cross-section taken along lines II—II of FIG. 1.

Broadly in the practice of the invention a typical mold for vacuum arc melting is provided having means for producing a nonoxidizing atmosphere therein by continuous evacuation of the mold interior during the arc melting operation. A nonconsumable electrode, which may be of conventional graphite or copper construction, is used within the mold in the well-known manner to provide the arc for melting. The nonconsumable electrode, in accordance with the practice of the invention, is offset a distance from the longitudinal axis of the mold to provide an arc that is correspondingly offset. The solid particulate material to be melted, which may be scrap or pure metal, is introduced to the mold for melting along the longitudinal axis of the mold or at substantially the center of the mold cross-section. The portion of the mold at which melting occurs is surrounded by a magnetic coil as a means for producing a magnetic field within the mold during melting so as to provide a swirling, stirring action to the molten metal. By having the electrode offset from the center of the mold it is possible to introduce the material for melting at the center thereof. The feed rate of the particulate material to be melted and the arc current of the electrodes are regulated to produce during melting an embryo casting having the characteristic bottom, solidified portion with a top surface of a generally concave configuration, a partially solidified portion of a generally conical configuration extending axially with respect to the mold from the top surface of the solidified portion and a liquid toroidal portion encircling axially the partially solidified portion. Particulate material introduced to the mold axially is deposited at the partially solidified portion of the embryo casting, rather than at the liquid portion thereof. Since these particles strike a partially solidified or semisolid rather than liquid material, splashing is minimized. This, in combination with the stirring action, which results in a swirling of the molten metal in a circular fashion adjacent the mold walls, prevents the buildup or collar typically associated with prior-art nonconsumable electrode melting operations of this type. In addition since not all of the particles introduced to the mold are melted a savings in power and operating time result.

Preferably in the practice of the invention a plurality of nonconsumable electrodes is employed and ideally three electrodes. With a plurality of electrodes each is offset from the longitudinal axis of the mold and all are in substantially uniform, spaced-apart relation within the mold to produce a plurality of arcs during melting that are, with respect to the mold cross-section and molten metal pool being melted therein, in substantially uniform spaced-spart relation.

With reference to the drawings, and particularly FIGS. 1 and 2 thereof, there is shown schematically a portion of a mold 10 having conventional means (not shown) for permitting continuous evacuation thereof. Surrounding the mold 10 is a magnetic coil 12 adapted in the well-known manner to provide a magnetic field within the mold interior to continuously stir the molten metal within the mold during the melting operation. Three nonconsumable electrodes, designated as 14A, 14B and 14C, are positioned within the mold in substantially uniform spaced-apart relation and offset from the longitudinal axis of the mold in a triangular configuration. Each electrode provides an arc 16 between the electrode tip and a molten metal pool 18 within the mold. The solidified portion of the metal within the mold is indicated as 20 and the interface thereof within the molten metal pool has the typical concave configuration, with a generally conical partially solidified portion 21 extending axially with respect to the mold from the concave top of the solidified portion. Means (not shown), which may be a vibratory feeder or like, are provided for introducing particles 22 of scrap and other material to be melted in the mold. The particles 22 are introduced axially with respect to the mold at the partially solidified portion 21.

During the melting operation the arcs 16 produced by the plurality of nonconsumable electrodes maintains the bath 18 within the mold molten. As the particles are introduced to the central portion of the bath and strike the partially solidified portion 21, few if any of the solid feed particles rebound to the mold walls and the falling particles cause no appreciable splash of liquid metal against the mold wall. Consequently a smooth well melted ingot surface low in volatile impurities is obtained. Volatile impurities which may be present in unmelted particles near the center of the ingot will be removed on remelting but the resulting gases will eject particles into the liquid pool. In contrast, volatile impurities on the electrode surface eject particles against the mold wall resulting in a rough ingot surface. Consequently, an improved ingot surface is obtained on remelting ingots made by the procedure described herein compared to the previous practice of melting the first melt ingot with one centrally located nonconsumable electrode.

I claim:

1. An electrode of a titanium-base alloy for use in consumable arc remelting having a core of titanium-base alloy particles encased in and surrounded by titanium-base alloy solidified from molten liquid thereof, said electrode being produced by a vacuum arc melting nonconsumable electrode practice conducted in apparatus having a plurality of nonconsumable electrodes, the centers of which are nearer the mold wall than the center of the mold and a coil surrounding the mold and carrying direct current to produce a magnetic field for the purposes of swirling said molten liquid alloy wherein a charge of particles of said titanium-base alloy are fed to the central portion of the mold at a rate controlled in relation to the power input to said electrode to prevent complete melting of the central portion of said charge.

2. In the vacuum arc melting of reactive metals and alloys in a mold having a nonoxidizing atmosphere therein by the use of at least two nonconsumable electrodes each adapted to supply melting arcs offset from the longitudinal axis of the mold, the improvement comprising feeding metal or alloy particles for melting to substantially the center or longitudinal axis of the mold, regulating the feed rate and arc current to produce during melting within said mold an embryo casting having a first bottom, solidified portion with a top surface, a second partially solidified portion of a generally conical configuration extending axially with respect to said mold from the top surface of said first solidified portion, and a third liquid toroidal portion encircling axially said second partially solidified portion.

3. The method of claim 2 wherein said reactive metal or alloy particles are selected from the group consisting of titanium and titanium-alloy scrap, zirconium and zirconium alloy scrap, and titanium sponge.

4. The method of claim 2 wherein said melting is conducted in a water-cooled copper mold.

5. The method of claim 2 wherein swirling of said third liquid portion is produced during melting by an interaction of a magnetic field intersecting said third portion and said melting arcs.

6. The method of claim 5 wherein two electrodes are employed and are connected in a series to a direct-current source so that the current flows from one electrode through said embryo casting to the other electrode.

* * * * *